US008991056B2

(12) United States Patent
Gerbl

(10) Patent No.: US 8,991,056 B2
(45) Date of Patent: Mar. 31, 2015

(54) METHOD FOR PRODUCING A GROUP OF PANELS FOR IMITATING A LONG FLOORBOARD

(75) Inventor: Michael Gerbl, Erpfendorf in Tirol (AT)

(73) Assignee: Fritz Egger GmbH & Co. OG, Unterradlberg (AT)

( * ) Notice: Subject to any disclaimer, the term of this patent is extended or adjusted under 35 U.S.C. 154(b) by 309 days.

(21) Appl. No.: 13/393,787

(22) PCT Filed: Dec. 16, 2010

(86) PCT No.: PCT/EP2010/069859

§ 371 (c)(1),
(2), (4) Date: Mar. 1, 2012

(87) PCT Pub. No.: WO2011/085898

PCT Pub. Date: Jul. 21, 2011

(65) Prior Publication Data

US 2012/0156432 A1 Jun. 21, 2012

(30) Foreign Application Priority Data

Dec. 21, 2009 (EP) .......................... 10 2009 060 103

(51) Int. Cl.

*B23P 17/00* (2006.01)
*B44C 5/04* (2006.01)
*B44F 9/02* (2006.01)
*E04F 13/08* (2006.01)
*E04F 15/02* (2006.01)

(52) U.S. Cl.

CPC ................. *B44C 5/0469* (2013.01); *B44F 9/02* (2013.01); *E04F 13/0871* (2013.01); *E04F 13/08* (2013.01); *E04F 15/02* (2013.01); *E04F 15/02033* (2013.01)

USPC .... 29/897.32; 29/897.3; 428/151; 52/745.19; 52/745.2

(58) Field of Classification Search

CPC ...... B44C 5/0469; B44F 9/02; E04F 13/0871; E04F 13/08; E04F 15/02; E04F 15/02033

USPC ................. 29/897.3, 897.32, 425; 52/745.19, 52/745.2; 144/329, 344, 345, 359; 425/151

See application file for complete search history.

(56) References Cited

U.S. PATENT DOCUMENTS 6,465,046 B1 * 10/2002 Hansson et al. .............. 427/256
7,964,133 B2 * 6/2011 Cappelle et al. .............. 264/293

(Continued)

FOREIGN PATENT DOCUMENTS

DE 102005002295 A1 7/2006
DE 102005047767 A1 4/2007

(Continued)

*Primary Examiner* — Ryan J Walters
(74) *Attorney, Agent, or Firm* — The Webb Law Firm

(57) ABSTRACT

The invention relates to a group of elongate panels for imitating a slat, the group comprising at least two slat end panels which have respectively a first short traverse edge and a second short traverse edge and two longitudinal edges and which, when the first respective short traverse edges are placed end to end or are arranged on the end of short traverse edges of at least one elongate intermediate panel, form a slat which has a continuous decoration on the joint of the traverse edges. The panels may have bevel longitudinal edges on their decorated sides, and the second short traversal edge of the respective slat end panel is formed on the decorated side as a bevel transversal edge.

16 Claims, 3 Drawing Sheets

(56) References Cited

U.S. PATENT DOCUMENTS

| | | | |
|---|---|---|---|
| 2006/0179773 | A1 | 8/2006 | Pervan |
| 2008/0066406 | A1 | 3/2008 | Durnberger |
| 2008/0184647 | A1 * | 8/2008 | Yau .............................. 52/589.1 |
| 2010/0314368 | A1 | 12/2010 | Groeke et al. |

FOREIGN PATENT DOCUMENTS

| | | | |
|---|---|---|---|
| DE | 102005063034 | A1 | 7/2007 |
| EP | 1541373 | A2 | 6/2005 |
| WO | 9301378 | A1 | 1/1993 |
| WO | 2006074831 | A1 | 7/2006 |

* cited by examiner

METHOD FOR PRODUCING A GROUP OF PANELS FOR IMITATING A LONG FLOORBOARD

BACKGROUND OF THE INVENTION

1. Field of the Invention

The invention relates to a method for producing at least a group of elongate panels for imitating a long floorboard, which group comprises at least two floorboard end panels which each comprise a first short transverse edge and a second short transverse edge and two longitudinal edges and which form, with their respective first short transverse edges abutting each other or with their respective first short transverse edges abutting short transverse edges of at least an elongate intermediate panel, a long floorboard having a decor, in particular a wood decor, which continues steadily at the transverse edge joint, the panels having bevelled longitudinal edges on their decorated side, and the second short transverse edge of the respective floorboard end panel, on its decorated side, being formed as a bevelled transverse edge. The group of panels according to the invention is provided for the production of wall, ceiling and floor coverings, preferably laminate flooring.

2. Description of the Related Art

In order to provide a paper web or another large-sized substrate, for example a large-sized carrier board, with a decor, in particular a wood decor, indirect gravure printing is typically used. The design of the decor which can be achieved thereby is restricted within certain limits by the impression cylinder used. The circumference of an impression cylinder is usually about 1300 mm, and its length about 2000 mm. Using an impression cylinder of this type, 10 panels or panel decors having a width of approximately 200 mm and a length of about 1300 mm can be printed per revolution. A so-called "half-size" is usually about 2800 mm long and 2070 mm wide, with machining allowance. A decor paper sheet which is printed via two revolutions of the impression cylinder can then be applied thereto. With this selection of the proportions, 20 panels are reproduced from a half-size. A standard board size known from the production of wood material boards is the 2070 mm×5610 mm size. A board of this type cut to half of its length is referred to as half-size.

The decors are generally applied by means of rollers either initially to a decor paper or directly to the carrier board. A decor is thus repeated depending on the circumference of the impression cylinder. The lengths of the panels are adapted to this length. However, it may be desirable, in particular in the region of the wood decors, to imitate the visual appearance of a longer floorboard. In order to achieve this, so-called "overlapping decors" are used. These are decors which are designed in such a way that the decor at the end of each floorboard connects to the decor of the start of each floorboard. If floorboards of this type are lined up at their ends, that is to say the short transverse edges, substantially without gaps, there is no discontinuity in the decor, resulting in the visual appearance of a floorboard which apparently extends over the entire length of the row. This impression can be increased further if the longitudinal sides of the panels have bevelled edges, since these promote the optical impression of the longitudinal extension. In the case of greater room lengths, however, this results in the impression of an unnaturally long floorboard. In order to achieve as fully as possible the impression of a long floorboard, in accordance with the familiar model from the field of real wood of "ship floorboards" or "country house floorboards", it is desirable to reproduce floorboard lengths in the range of 2 m to 5 m.

SUMMARY OF THE INVENTION

The object of the present invention is therefore to provide panels and a method for producing a group of panels using which the appearance of a long floorboard can be imitated more effectively.

The method according to the invention, of the type mentioned at the outset, is characterised by the following steps:

- providing a large-sized, substantially rectangular board which is provided on its upper face with at least a group of elongate panel decors, the respective panel decor having a decor direction and extending parallel to one of the board edges, and the respective group of panel decors in a first peripheral region, which extends along one of the board edges and extends transversely to the decor direction of the panel decors, having a first panel decor portion which, for forming a steadily continuing decor, in particular a wood decor, matches a second panel decor portion, located in the same first peripheral region and/or in the opposite peripheral region of this group of panel decors, of a panel decor which is offset transversely to the decor direction from the first panel decor portion,
- dividing the large-sized board into individual panels, each comprising one of the panel decors,
- profiling the longitudinal and transverse edges of the respective panel, and
- producing bevels in such a way that the longitudinal edges on the decorated side of the finished panel and the second transverse edge, which is not intended for the formation of a steadily continuing decor, are bevelled.

Using the method according to the invention, a group of panels is produced which, owing to the bevelled transverse edges opposite the transverse edge joint, imitate the appearance of a long floorboard more effectively.

A preferred configuration of the invention involves the respective group of panel decors in the first peripheral region, which extends transversely to the decor direction of the panel decors, comprising a third panel decor portion which does not match a fourth panel decor portion, located in the opposite peripheral region of this group of panel decors, of a panel decor which is offset transversely to the decor direction from the third panel decor portion, a bevelled transverse edge being produced on the decorated side of these non-matching panel decor portions in each case. This results in a discontinuity of the decor at the bevelled transverse edge of the relevant panel with respect to the adjoining panel, as a result of which the impression of a natural or defined long floorboard is improved further.

The respective group of panel decors can be spaced apart from the board edges by trimming and/or machining allowances.

According to another advantageous configuration of the invention, it is provided that the bevels are introduced, in particular impressed, into the large-sized board before the division thereof. In terms of production it is particularly favourable for the bevels to be impressed into the board when the impregnated decor paper is being pressed onto the board.

In an alternative configuration, which is advantageous in particular in the case of carrier boards printed directly with a decor, the bevels are only produced after the division of the large-sized board. In this respect, it is further proposed that the bevels be produced during profiling of the longitudinal and transverse edges of the respective panel. In this case, preferably at least the longitudinal edges of the panel are provided with a mechanically locking profile. Combining the profiling of the panel edges with the bevelling of the long panel edges and the short panel edge which is not intended for the formation of a steadily continuing decor makes it possible to produce panels according to the invention particularly efficiently.

In order to imitate the appearance of a long floorboard made of real wood as lifelike as possible, another advantageous configuration of the invention provides that the bevels are provided with a decor which continues the upper-face panel decor in a suitable manner.

On the other hand, however, according to the invention the impression of a long floorboard can also be imitated more effectively by providing the bevels with a coloured coating which contrasts with the colour of the upper-face panel decor.

Another advantageous configuration of the invention involves the second transverse edge of the panel, which edge is not intended for the formation of a steadily continuing decor, being marked by the application of a marking to the board, the marking being determined by means of an optical scanning device and the production of the bevel on the second transverse edge being controlled automatically as a function of a detection of the marking by the scanning device. In this case, the marking is preferably applied outside the decor, in particular on the back of the board or panel, opposite the decorated side.

Another advantageous configuration of the invention is characterised, with regard to the production of the bevels on the relevant panel edges, in that the second transverse edge of the panel, which edge is not intended for the formation of a steadily continuing decor, is determined by the detection of the panel decor by means of an optical scanning device, for example a camera, and a comparison of the detected panel decor with at least a reference panel decor, the bevel on the second transverse edge being produced automatically as a function of this comparison.

Further preferred and advantageous configurations of the method according to the invention are given in the dependent claims.

BRIEF DESCRIPTION OF THE DRAWINGS

The invention will be described in more detail below with reference to drawings showing a plurality of embodiments. In the figures.

DESCRIPTION OF THE PREFERRED EMBODIMENTS

Figure 1:
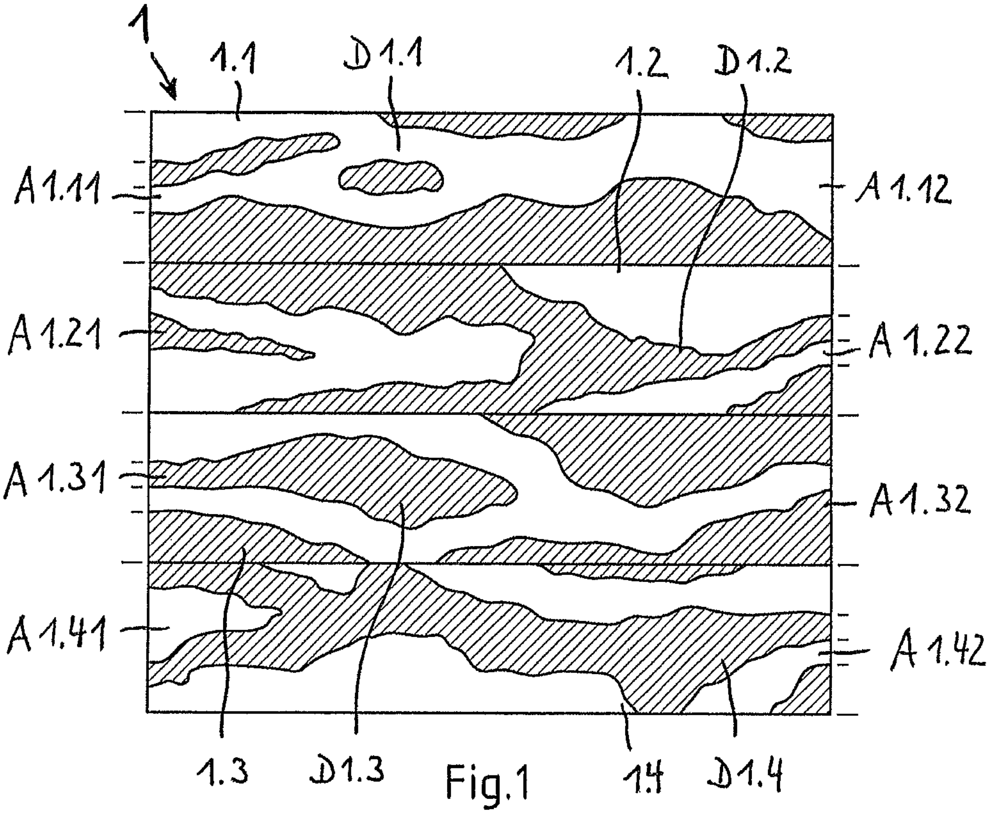
FIG. 1 is a schematic plan view of a rectangular carrier board which is provided with four panel decors having a common principal decor direction and extending parallel to one of the board edges.

The boards 1, 2, 3, 4 shown in the drawings and the panels 1.1, 1.2, 1.3 and 1.4 or 2.1, 2.2, 2.3, 2.4, 2.5 and 2.6 or 3.1, 3.2, 3.3, 3.4, 3.5 and 3.6 or 4.1, 4.2, 4.3, 4.4, 4.5 and 4.6 obtained therefrom by division (separation) consist of a carrier board which is preferably a board of derived timber product, compact board, wood/plastics material composite board or combinations of such materials or boards.

The large-sized carrier board 1, 2, 3 or 4 is provided on its upper face with a plurality of panel decors D1.1, D1.2, D1.3 and D1.4 or D2.1, D2.2, D2.3, D2.4, D2.5 and D2.6 or D3.1, D3.2, D3.3, D3.4, D3.5 and D3.6 or D4.1, D4.2, D4.3, D4.4, D4.5 and D4.6, which have a common decor direction and extend parallel to one of the panel edges.

The board 1, 2, 3 or 4 is preferably provided on its upper face with at least two identical groups of elongate panel decors D1.1, D1.2, D1.3 and D1.4 or D2.1, D2.2, D2.3, D2.4, D2.5 and D2.6 or D3.1, D3.2, D3.3, D3.4, D3.5 and D3.6 or D4.1, D4.2, D4.3, D4.4, D4.5 and D4.6, although this is not shown here for the sake of simplicity.

The panel decors D1.1, D1.2, D1.3 and D1.4 or D2.1, D2.2, D2.3, D2.4, D2.5 and D2.6 or D3.1, D3.2, D3.3, D3.4, D3.5 and D3.6 or D4.1, D42, D4.3, D4.4, D4.5 and D4.6 are, for example, wood decors (wooden floorboard decors). The panel decors D1.1, D1.2, D1.3 and D1.4 or D2.1, D2.2, D2.3, D2.4, D2.5 and D2.6 or D3.1, D3.2, D3.3, D3.4, D3.5 and D3.6 or D4.1, D4.2, D4.3, D4.4, D4.5 and D4.6 are applied to the carrier board 1, 2, 3 or 4 by coating. The coating can be implemented as a film, laminate or lacquer. The laminate can be pressed directly onto the carrier board 1, 2, 3 or 4 continuously or in a "short-cycle" process, or can consist of a laminate material which is applied to the carrier board 1, 2, 3 or 4 in a separate pressing step. In contrast, the decor formed of lacquer is printed directly onto the carrier board 1, 2, 3 or 4 and subsequently sealed by a transparent lacquer layer or a layer of a synthetic resin, preferably melamine resin, which is pressed onto the decorated board. If necessary, the back of the carrier board 1, 2, 3 or 4 is provided with a back pull.

The large-sized board 1, 2, 3 or 4 is divided into individual panels 1.1, 1.2, 1.3 and 1.4 or 2.1, 2.2, 2.3, 2.4, 2.5 and 2.6 or 3.1, 3.2, 3.3, 3.4, 3.5 and 3.6 or 4.1, 4.2, 4.3, 4.4, 4.5 and 4.6, each comprising one of the panel decors D1.1, D1.2, D1.3 and D1.4 or D2.1, D2.2, D2.3, D2.4, D2.5 and D2.6 or D3.1, D3.2, D3.3, D3.4, D3.5 and D3.6 or D4.1, D4.2, D4.3, D4.4, D4.5 and D4.6, by means of a cutting device, for example a saw or a laser beam. A long floorboard which is defined in terms of its length is formed from a group of the elongate panels 1.1, 1.2, 1.3 and 1.4 or 2.1, 2.2, 2.3, 2.4, 2.5 and 2.6 or 3.1, 3.2, 3.3, 3.4, 3.5 and 3.6 or 4.1, 4.2, 4.3, 4.4, 4.5 and 4.6 by arranging them appropriately in sequence (see FIGS. 4*a*, 4*b* and 5).

In order to imitate a floorboard having a length in the range of approximately 2 m to 5 m, two, three or four panels 1.1, 1.2, 1.3 and 1.4 or 2.1, 2.2, 2.3, 2.4, 2.5 and 2.6 or 3.1, 3.2, 3.3, 3.4, 3.5 and 3.6 or 4.1, 4.2, 4.3, 4.4, 4.5 and 4.6 having an overlapping decor at their (first) short edges (transverse edges) are joined together. The "start" of the first panel and the "end" of the last, in other words the second, third or fourth panel is provided with a bevelled edge, and likewise the respective adjacent panel of the next group, in such a way that a joint F which is V-shaped in cross-section is formed between the groups on the decorated side.

Figure 6:
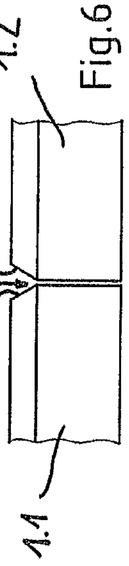
FIG. 6 is a schematic side view of the transverse edge joint of two adjacent panels which have bevelled edges and together form a V-shaped joint.

FIG. 6 is a side view of end portions of two panels 1.1, 1.2 which adjoin each other with their short edges (transverse edges). The edges of the panels 1.1, 1.2 are bevelled on the decorated side. The bevels 5, 6 together form a V-shaped joint F.

The edges are preferably bevelled during milling of the edge profiles. The carrier board 1, 2, 3 or 4 is thus exposed at the resulting bevels. The exposed bevel is protected by an appropriate treatment, for example by coating, printing (in particular by means of transfer printing), non-cutting smoothing, thermal tempering (via laser or thermo-smoothing).

In the case of laminated carrier boards 1, 2, 3 or 4, the chamfers (bevels) are preferably impressed into the carrier board when the impregnated decor paper is being pressed onto the carrier board.

Figure 4A:
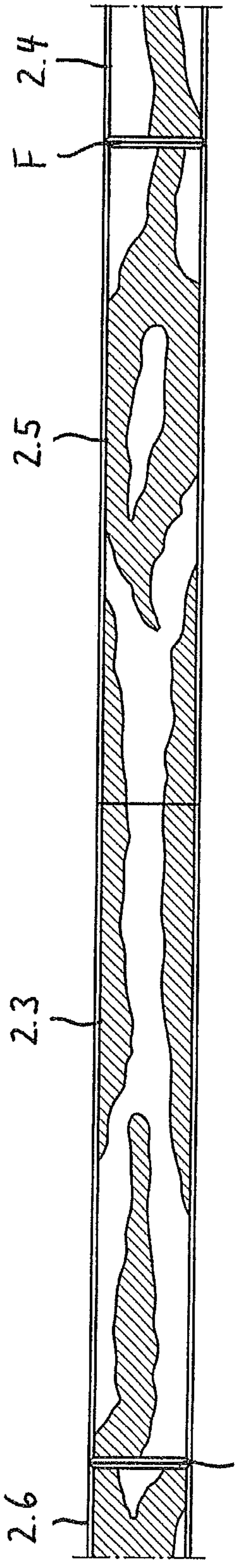
FIG. 4*a* is a schematic plan view of a long floorboard made up of two panels according to the invention.
Figure 4B:
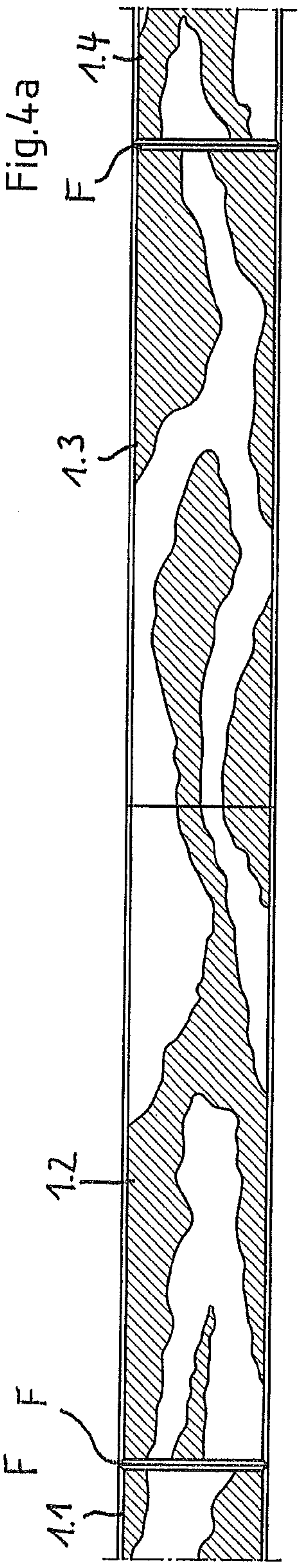
FIG. 4*b* is a schematic plan view of a further long floorboard made up of two panels according to the invention.

A group of two panels consists of two floorboard end panels (peripheral panels), namely a left and a right floorboard end panel (see FIGS. 4*a* and 4*b*). The left floorboard end panel 2.3 or 1.2 has, at its left periphery, a chamfer and no overlapping decor. In the case of the right floorboard end panel 2.5 or 1.3, the chamfer and a non-overlapping decor, that is to say a decor which does not match the decor of the next panel 2.4 or 1.4 within the meaning of a steadily continuing decor progression, are situated the other way round.

Figure 5:
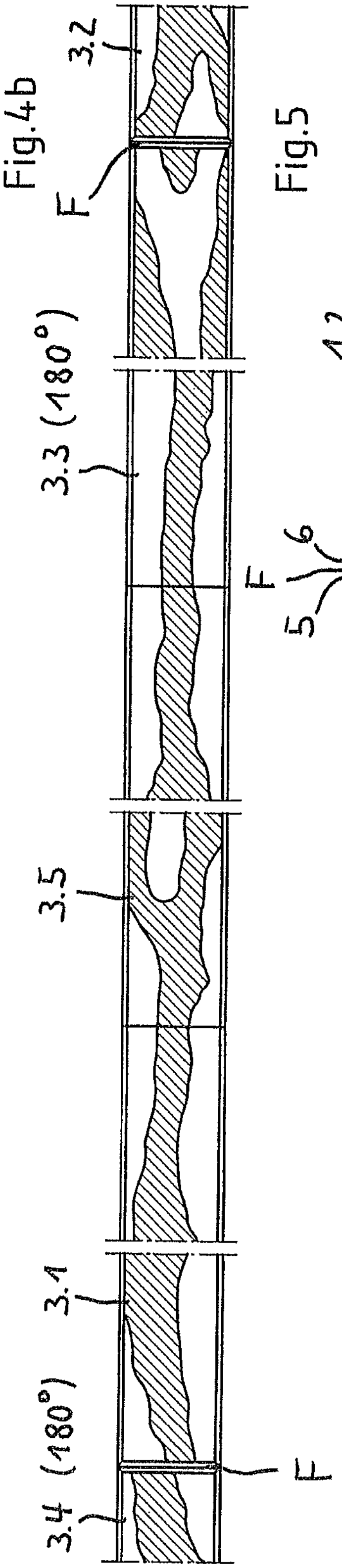
FIG. 5 is a schematic plan view of a long floorboard made up of three panels according to the invention.

A group of more than two panels consists of two floorboard end panels (peripheral panels) 2.3, 2.4, 2.5, 2.6 or 3.1, 3.2, 3.3, 3.4 and one, two or three intermediate panels (middle panels) 2.1, 2.2 or 3.5, 3.6, the term intermediate panel within the meaning of the present invention denoting a panel which is provided at its two short edges (transverse edges) with an overlapping decor, but has no chamfers (see FIG. 5).

In accordance with the above-mentioned proportions, the circumference of an impression cylinder can usually fit twice on a half-size. Accordingly, the real end of the subsequent panel 1.1, 1.2, 1.3 and 1.4 or 2.1, 2.2, 2.3, 2.4, 2.5 and 2.6 or 3.1, 3.2, 3.3, 3.4, 3.5 and 3.6 or 4.1, 4.2, 4.3, 4.4, 4.5 and 4.6 will not be present at the opposite edge of the half-size, but rather substantially in the centre of the half-size, but this ultimately leads in turn to the same result after the division of the large-sized board 1, 2, 3 or 4 into the individual panels. For the sake of simplicity this situation is not taken into further consideration in the following.

If groups of two panels are to be produced in each case, a half-size or a carrier board 1 for example is provided, which is provided on its upper face with an even number or at least a group of elongate panel decors D1.1, D1.2, D1.3 and D1.4 which have a common principal direction, the principal direction extending substantially parallel to one of the board edges. The board 1 or the (respective) group of panel decors D1.1, D1.2, D1.3 and D1.4 further have, in a first peripheral region which extends along one of the board edges and extends transversely to the decor direction of the panel decors, a plurality of (first) panel decor portions A1.11, A1.31 which, for forming a steadily continuing decor, each match a corresponding number of (second) panel decor portions A1.22, A1.42, located in the opposite peripheral region of this group of panel decors (or in the centre of the half-size), of panel decors D1.2, D1.4 which are offset transversely to the decor direction from the (first) panel decor portion. The board 1 or the (respective) group of panel decors D1.1, D1.2, D1.3 and D1.4 further has, in the first peripheral region which extends transversely to the decor direction of the panel decors, plurality of panel decor portions A1.21, A1.41 which do not match a corresponding number of decor portions A1.12, A1.32, located in the opposite peripheral region of this group of panel decors (or in the centre of the half-size), of panel decors D1.1, D1.3 which are offset transversely to the decor direction from the panel decor portions A1.21, A1.41. With reference to FIG. 1, the number of matching panel decor portions A1.11, A1.22, A1.31, A1.42 is equal to the number of non-matching panel decor portions A1.21, A1.12, A1.41, A1.32 (cf. also FIG. 4*b*).

If, on the other hand, groups of three panels for imitating long floorboards are to be produced in each case, a half-size or a carrier board 3 for example is provided, which is also provided on its upper face with an even number of panel decors D3.1, D3.2, D3.3, D3.4, D3.5 and D3.6 which have a common principal direction, the principal direction extending substantially parallel to one of the board edges. In this case, the respective group of panels for imitating a defined long floorboard comprises two floorboard end panels 3.1, 3.2, 3.3 or 3.4 and an intermediate panel 3.5 or 3.6, the floorboard end panels forming, with their (first) short transverse edges abutting the short transverse edges of the intermediate panel 3.5 or 3.6, a long floorboard having a wood decor which continues steadily at the transverse edge joint.

Figure 2:
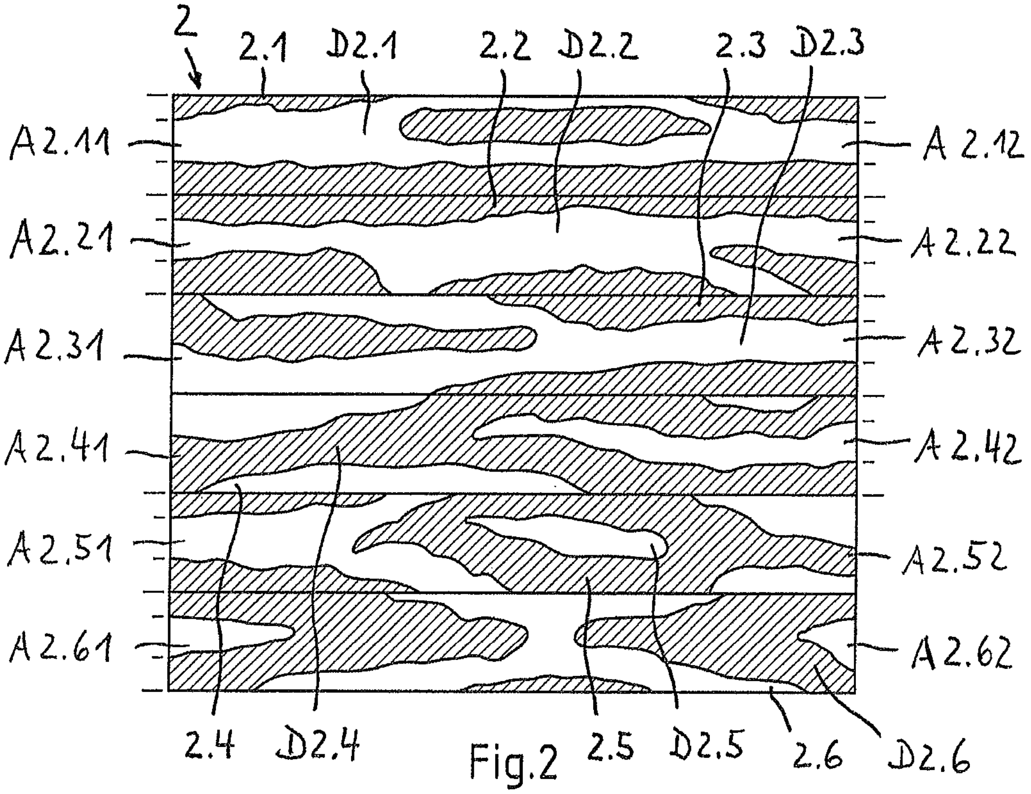
FIG. 2 is a schematic plan view of a further carrier board which according to a second embodiment is provided with six panel decors having a common principal decor direction and extending parallel to one of the board edges.

A board 2 which is suitable for the production of groups of in each case three panels for imitating long floorboards is also shown in FIG. 2. The board 2 has, at its left end or in the left peripheral region, four panel decor portions A2.11, A2.21, A2.51 and A2.61 which, for forming a steadily continuing decor, each match a corresponding number of decor portions A2.12, A2.22, A2.32 and A2.42, located in the opposite peripheral region of the board, of panel decors D2.1, D2.2, D2.3 or D2.4. The board 2 further has, in its left peripheral region, two panel decor portions A2.31 and A2.41 which do not match a corresponding number of panel decor portions A2.52 and A2.62, located in the opposite peripheral region of the board 2, of panel decors D2.5 or D2.6 which are offset transversely to the decor direction from the panel decor portions A2.31 and A2.41. In this case, the number of matching panel decor portions A2.11, A2.21, A2.51, A2.61, A2.12, A2.22, A2.32 and A2.42 is greater than, namely twice the number of non-matching panel decor portions A2.31, A2.41, A2.52 and A2.62.

In other words, in the example shown in FIG. 2, the upper third or the region of the upper two panels 2.1, 2.2 of the left edge of the half-size is/are provided with an overlapping decor, the middle third or the next two panels 2.3, 2.4 at the left periphery is/are not provided with an overlapping decor and the lower third or the lower two panels 2.5, 2.6 at the left periphery is/are again provided with an overlapping decor. Half of the left peripheral region having an overlapping decor, namely the upper third, is opposite a peripheral region (edge portion) which also has an overlapping decor, while the other half of the left peripheral region having an overlapping decor, namely the lower third, is opposite a peripheral region (edge portion) without an overlapping decor.

If a group of four panels for imitating a defined long floorboard is to be produced, a corresponding procedure is to be followed. In this case, a group then consists of two floorboard end panels (peripheral panels) and two intermediate panels (middle panels). Accordingly, for each half-size or carrier board a quarter of the panels are to be produced as right peripheral panels, a quarter as left peripheral panels and half of the panels as intermediate panels.

However, defined long floorboards of different lengths can also be obtained from the above-described configurations of the half-sizes for groups of three and four panels, namely if a long floorboard made for example of two panels 3.1 and 3.2 and one made of four panels 3.3, 3.4, 3.5 and 3.6 is formed, or if a defined long floorboard made for example of three panels 3.1, 3.5 and 3.2 and one made of five panels 3.3, 3.5, 3.6, 3.5 and 3.4 is formed. Ultimately, however, it is also within the scope of the invention to design a large-sized carrier board or a half-size in such a way that, when laying a relatively large number of the panels obtained therefrom over a relatively large area, inevitably defined long floorboards of different lengths are produced. A half-size of this type could for example have three left and right floorboard end panels and four intermediate panels in each case. Two groups of three panels and a group of four panels can then be formed therefrom. In any case, when laying panels of this type over a relatively large area there is inevitably a need to produce defined long floorboards of different lengths.

Figure 3A:
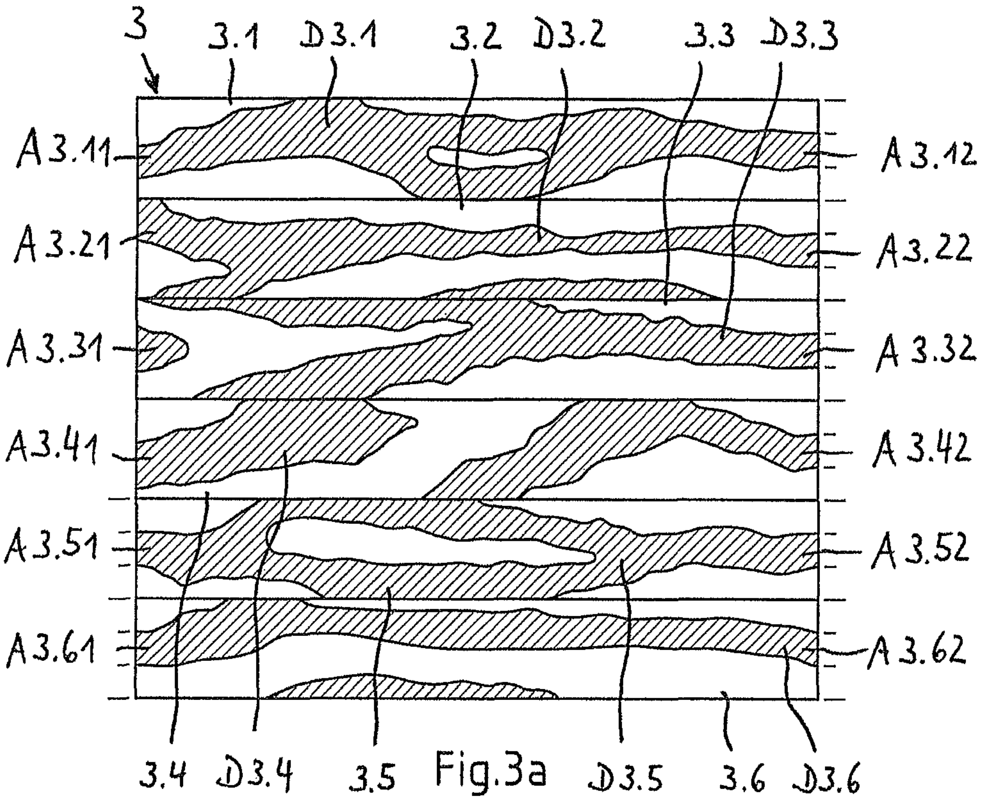
FIG. 3*a* is a schematic plan view of a third carrier board which according to a third embodiment is also provided with six panel decors having a common principal decor direction and extending parallel to one of the board edges.

Another possibility for producing right and left floorboard end panels involves providing at a periphery of a half-size, which periphery extends transversely to the principal direction of the decor, panel decor portions A3.11, A3.21, A3.31, A3.41 which do not match any of the panel decor portions A3.12, A3.22, A3.32, A3.42, A3.52, A3.62 of the opposite periphery of the half-size, while all of the opposite panel decor portions A3.12, A3.22, A3.32, A3.42, A3.52, A3.62 of the periphery of the half-size match each other. The panels 3.1, 3.2, 3.3, 3.4 obtained from a half-size configured in this way, which have decor portions A3.11, A3.21, A3.31, A3.41 which do not match any of the decor portions A3.12, A3.22, A3.32, A3.42, A3.52, A3.62 of the opposite periphery of the half-size, are then each rotated through 180° before their edges are machined, whereby right and left floorboard end panels (peripheral panels) are then obtained. However, a prerequisite for this is that the decor portions which are supposed to match each other also do so when they are rotated through 180°. See FIG. 3*a* and FIG. 5 in this respect. The panels shown in this case each have at the right periphery—based on their longitudinal central axis—a symmetrical peripheral decor.

Figure 3B:
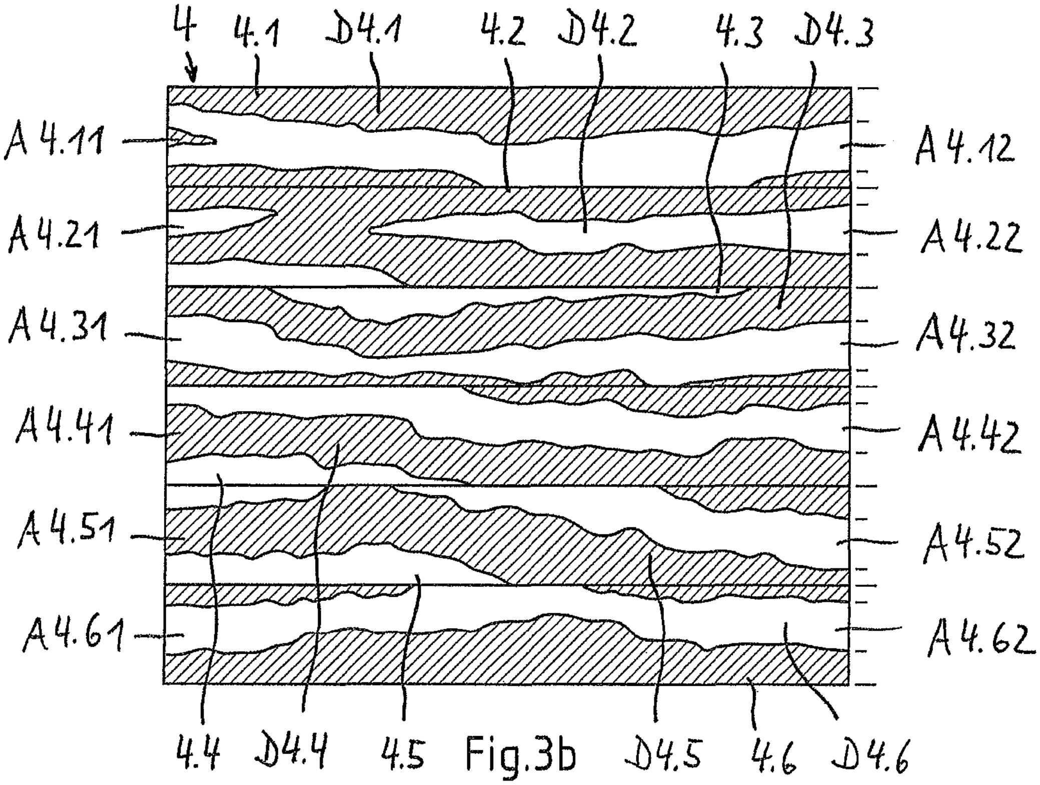
FIG. 3*b* is a schematic plan view of a fourth carrier board which according to a fourth embodiment is also provided with six panel decors having a common principal decor direction and extending parallel to the board edge.

FIG. 3*b* shows a carrier plate 4 or a half-size which is provided with panel decors and from which groups of two panels (for example: 4.1, 4.2 and 4.3, 4.4 and 4.5, 4.6) can be produced, in order to form therefrom a defined long floorboard. In this embodiment the decor periphery shown on the left is provided in order to form the panel edges which are to be provided with a chamfer. The short edges of the panels, the decors of which are to match each other in each case, are produced from the opposite periphery. For this purpose, it is provided that the peripheral panel decor portions of the half of the panels rotated through 180° match the peripheral panel decor portions of the other half of the panels. Prior to profiling these panels 4.1, 4.2, 4.3, 4.5 and 4.6, every other panel (or the corresponding panel in each case) is then rotated through 180°.

In the embodiment shown in FIG. 3*b*, all of the matching panel decor portions A4.12, A4.22, A4.32, A4.42, A4.52, A4.62 of the respective group of panel decors D4.1, D4.2, D4.3, D4.4, D4.5, D4.6 are located in the same first peripheral region of this group. In this case, the matching panel decor portions A4.12, A4.22, A4.32, A4.42, A4.52, A4.62 are formed asymmetrically with respect to the longitudinal central axis of the respective panel decor D4.1, D4.2, D4.3, D4.4, D4.5 or D4.6.

If the edges are chamfered before production of the mechanically locking edge profile, all of the chamfers can be produced at the same milling station. The corresponding panels are subsequently rotated through 180° and provided with the edge profiles. Of course, in the case of the half-size according to FIG. 3*b*, a proportion of middle floorboards could also be provided, which would then need to be provided on both side with an overlapping decor.

In certain cases, for instance with certain decors, the desired optical effect of a defined long floorboard can also be achieved by producing panels for which all of the decor portions of the short edges match one another, the long floorboards formed therefrom differing from each other only by way of the chamfer at the transverse edges which are not intended for forming a steadily continuing decor. For this purpose half-sizes are used which are provided with a decor corresponding to that used for producing conventional long floorboards, namely when each portion of the edges extending transversely to the decor direction matches all the others of these decor portions. On the other hand, in order to produce floorboards which do not imitate a length which corresponds to the length of the entire row, it is provided that individual floorboards are provided at their short edges (transverse edges) with a chamfer, care needing to be taken that the same number of right and left peripheral panels are produced in each case. This embodiment is advantageous in that it can be used in the case of decors for which decor impression cylinders are already available from the production of conventional endless decors.

If the chamfers are not impressed when the coating is being pressed onto the boards 1, 2, 3 or 4, the chamfers are produced in a separate production step. This is typically carried out by cutting machining by means of milling or broaching tools. Alternatively, non-cutting methods, for example machining methods by means of a laser beam, can also be used for this purpose. It is advantageous to provide the machining step for shaping the chamfer during production of the edge profiles. However, a production step which is separate in terms of time and/or location can be provided for this purpose. The bevels can be coated directly after production thereof.

The bevels are preferably provided with a decor. This decor which is applied to the bevels can also be designed as a continuation of the upper-face panel decor.

Alternatively, the coating of the bevels is designed with a colour which contrasts with the colour of the face of the panels. As a result, the panel boundaries can be emphasised still further if this is desirable. In this way the optical effect of a defined long floorboard can advantageously be increased.

In order, where necessary, to provide the short edges of the panels 1.1, 1.2, 1.3 and 1.4 or 2.3, 2.4, 2.5 and 2.6 or 3.1, 3.2, 3.3 and 3.4 or 4.1, 4.2, 4.3, 4.4, 4.5 and 4.6 with a chamfer, the machining tool provided for this purpose can be brought up to the edge of said panel or the corresponding panel is brought up to the machining tool. A combination of these procedures is also possible.

An economical production of panels 1.1, 1.2, 1.3 and 1.4 or 2.3, 2.4, 2.5 and 2.6 or 3.1, 3.2, 3.3 and 3.4 or 4.1, 4.2, 4.3, 4.4, 4.5 and 4.6 according to the invention preferably takes place with very short cycle times. It is thus possible to produce panels having a dimension of approximately 200 mm×1200 mm in the order of about 250 pieces per minute and more.

An automated determination of the short panel edges which must be provided with a bevelled edge is advantageous. This is preferably carried out using at least an optical scanning device which recognises whether or not a chamfer is to be made at a short edge of a panel. This can be achieved for example by providing the decor with respect to the respective edge with a particular marking. If this marking is then recognised by the optical scanning device, the edges are machined (or not). The tool for producing the chamfer is optionally brought into an active position. In this respect, the corresponding marking must not be applied with the decor. An optical detection unit could also be used to recognise whether or not an edge has an overlapping decor, and the edge machining controlled accordingly. It is also possible to provide the lower face of the respective panels 1.1, 1.2, 1.3 and 1.4 or 2.3, 2.4, 2.5 and 2.6 or 3.1, 3.2, 3.3 and 3.4 or 4.1, 4.2, 4.3, 4.4, 4.5 and 4.6 with a marking which is then used to further control the corresponding processing steps.

In the case of relatively large piece numbers of identical half-sizes to be processed, it is also possible to control the tools for producing the edge chamfer according to the sequence of panels. Thus, with a sequence of half-sizes according to FIG. 1, for example, a bevelled edge would always be produced for every second panel, the opposite side also being machined for every second panel, certainly whenever the other edge is not machined. If half-sizes according to FIG. 2 are machined, four edges to be machined are followed by two which must not be machined. The respective other side operates offset by two cycles.

The implementation of the invention is not limited to decors which are produced by means of roller printing. In order to retain the easily manageable panel lengths of usually about 1,200 mm, it is advantageous, also when other printing technologies such as digital printing are used, with which decors having more or less arbitrary lengths could be produced, to produce groups of panels which consist of left and right peripheral panels 1.1, 1.2, 1.3 and 1.4 or 2.3, 2.4, 2.5 and 2.6 or 3.1, 3.2, 3.3 and 3.4 or 4.1, 4.2, 4.3, 4.4, 4.5 and 4.6 or optionally at least an intermediate panel (middle panel) 2.1, 2.2 or 3.5, 3.6.

The invention claimed is:

1. A method for producing a group of elongate panels for imitating a long floorboard, wherein the group comprises at least two floorboard end panels, each comprising a first short transverse edge and a second short transverse edge and two longitudinal edges and which form, with the first short transverse edges abutting each other or with the first short transverse edges abutting short transverse edges of at least an elongate intermediate panel, a floorboard having a steadily continuing decor at a transverse edge joint, wherein the floorboard end panels have bevelled longitudinal edges on a decorated side, and wherein the second short transverse edge of each floorboard end panel, on the decorated side, is formed as a bevelled transverse edge, the method comprising the following steps:

providing a substantially rectangular board having edges and an upper face comprising a group of elongate panel decors, wherein each elongate panel decor has a decor direction and extends parallel to one of the edges of the substantially rectangular board, and wherein the group of elongate panel decors has a first panel decor portion, which is positioned in a first peripheral region, which extends along one of the edges of the substantially rectangular board and extends transversely to the decor direction of the group of elongate panel decors, wherein the first panel decor portion, for forming a steadily continuing decor, matches a second panel decor portion, located in the first peripheral region and/or in an opposite peripheral region of the group of elongate panel decors, of an elongate panel decor which is offset transversely to a decor direction from the first panel decor portion, dividing the substantially rectangular board into individual panels, each comprising one of the elongate panel decors, profiling the longitudinal and transverse edges of each floorboard end panel, and producing bevels on the longitudinal edges and the second transverse edge on the decorated side of the floorboard end panels.

2. The method according to claim 1, wherein the group of elongate panel decors in the first peripheral region, which extends transversely to the decor direction of the group of elongate panel decors, comprises a third panel decor portion which does not match a fourth panel decor portion, located in the opposite peripheral region of the group of elongate panel decors, of an elongate panel decor which is offset transversely to a decor direction from the third panel decor portion, a bevelled transverse edge being produced on the decorated side of the third panel decor portion and the fourth panel decor portion in each case.

3. The method according to claim 2, wherein a number of matching panel decor portions is equal to a number of non-matching panel decor portions.

4. The method according to claim 1, with the upper face comprising at least two identical groups of elongate panel decors.

5. The method according to claim 1, wherein the group of elongate panel decors is spaced apart from the board edges by trimming and/or machining allowances.

6. The method according to claim 1, wherein the first panel decor portion and the second panel decor portion of the group of elongate panel decors are located in the first peripheral region of the group of elongate panel decors.

7. The method according to claim 6, wherein the first panel decor portion and the second panel decor portion of the group of elongate panel decors are formed asymmetrically with respect to the longitudinal central axis of each elongate panel decor.

8. The method according to claim 1, wherein the bevels are introduced into the substantially rectangular board before the division thereof.

9. The method according to claim 8, wherein the bevels are impressed when impregnated decor paper is being pressed onto the board.

10. The method according to claim 1, wherein the bevels are produced after the division of the substantially rectangular board.

11. The method according to claim 10, wherein the bevels are produced during profiling of the longitudinal and transverse edges of the respective panel.

12. The method according to claim 1, wherein the bevels are provided with a decor which continues the group of elongate panel decors in a matched manner.

13. The method according to claim 1, wherein the bevels are provided with a colored coating which contrasts with the color of the group of elongate panel decors.

14. The method according to claim 1, wherein the bevels are smoothed in a non-cutting manner and/or a thermally tempered manner.

15. The method according to claim 1, wherein the second transverse edge of the panel, which is not intended for forming the steadily continuing decor, is marked by the application of a marking to the board, the marking is determined by means of an optical scanning device and the production of the bevel on the second transverse edge is controlled automatically as a function of a detection of the marking by the optical scanning device.

16. The method according to claim 1, wherein the second transverse edge of the panel, which is not intended for forming the steadily continuing decor, is determined by a detection of the panel decor by an optical scanning device and a comparison of the detected panel decor with at least a reference panel decor, the bevel on the second transverse edge being produced automatically as a function of this comparison.

* * * * *

UNITED STATES PATENT AND TRADEMARK OFFICE

CERTIFICATE OF CORRECTION

PATENT NO. : 8,991,056 B2
APPLICATION NO. : 13/393787
DATED : March 31, 2015
INVENTOR(S) : Michael Gerbl It is certified that error appears in the above-identified patent and that said Letters Patent is hereby corrected as shown below:

Title Page, Column 1, Item (30) Foreign Application Priority Data, Line 1, delete "(EP)" and insert -- (DE) --

Signed and Sealed this
Twenty-fourth Day of November, 2015

Michelle K. Lee
*Director of the United States Patent and Trademark Office*